(12) United States Patent
Xue et al.

(10) Patent No.: US 7,509,122 B2
(45) Date of Patent: Mar. 24, 2009

(54) METHOD AND SYSTEM FOR SUPPORTING NETWORK 3G DATA CAPABILITY INFORMATION IN A CDMA NETWORK

(75) Inventors: Hao Xue, Ottawa (CA); M. Khaledul Islam, Kanata (CA); William Daniel Willey, San Francisco, CA (US)

(73) Assignee: Research In Motion Limited, Waterloo, Ontario (CA)

( * ) Notice: Subject to any disclaimer, the term of this patent is extended or adjusted under 35 U.S.C. 154(b) by 82 days.

(21) Appl. No.: 10/755,812

(22) Filed: Jan. 12, 2004

(65) Prior Publication Data

US 2005/0153691 A1 Jul. 14, 2005

(51) Int. Cl.
*H04Q 7/20* (2006.01)
*H04B 7/212* (2006.01)
(52) U.S. Cl. ............... 455/432.1; 455/432.2; 455/432.3
(58) Field of Classification Search .............. 455/432.1, 455/432.2, 432.3, 434, 435.1, 552.1, 419, 455/437
See application file for complete search history.

(56) References Cited

U.S. PATENT DOCUMENTS

| | | | |
|---|---|---|---|
| 5,613,213 A | | 3/1997 | Naddell et al. |
| 5,903,832 A | * | 5/1999 | Seppanen et al. ......... 455/435.3 |
| 6,415,148 B1 | * | 7/2002 | Chiniga et al. .............. 455/434 |
| 6,993,336 B2 | * | 1/2006 | Aerrabotu et al. ........... 455/437 |
| 2002/0087674 A1 | | 7/2002 | Guilford et al. |
| 2003/0134637 A1 | * | 7/2003 | Cooper ....................... 455/432 |
| 2004/0219916 A1 | * | 11/2004 | Kim et al. ................. 455/435.3 |
| 2004/0249915 A1 | * | 12/2004 | Russell ....................... 709/223 |
| 2005/0090277 A1 | * | 4/2005 | Islam et al. ................. 455/525 |
| 2006/0104211 A1 | * | 5/2006 | Islam et al. ................. 370/252 |

FOREIGN PATENT DOCUMENTS

| | | |
|---|---|---|
| EP | 0 781 064 A2 | 6/1997 |
| EP | 0781064 | 6/1997 |
| WO | WO 99/45723 | 9/1999 |

(Continued)

OTHER PUBLICATIONS

Almgren; Roaming Method; Aug. 5, 2004; WO 2004/066663 A1.*

*Primary Examiner*—Melur Ramakrishnaiah
(74) *Attorney, Agent, or Firm*—David C. Jenkins; Brij K. Agarwal; Eckert Seamans Cherin & Mellott, LLC

(57) ABSTRACT

A method and system of providing a mobile data device in a wireless system with information about preferred networks to connect to, the mobile data device having a preferred roaming list with a list of networks, the method comprising the steps of: adding to the preferred roaming list information about whether each network in the list of networks supports third generation data capabilities; and determining preferred networks based on information within the preferred roaming list including a geographic area and whether the network supports third generation data capabilities, whereby, within the geographic area, the mobile data device prefers networks which support third generation data capabilities over networks which do not support said third generation data capabilities. Other information that may be added to the preferred roaming list includes whether the network supports data roaming, Mobile IP services or always-on features. The preferred roaming list may also include information about the device service capabilities.

7 Claims, 2 Drawing Sheets

FOREIGN PATENT DOCUMENTS

| | | |
|---|---|---|
| WO | WO 99/45723 A1 | 9/1999 |
| WO | 00/70901 A1 | 11/2000 |
| WO | 01/47316 A2 | 6/2001 |
| WO | 01/58190 A1 | 8/2001 |
| WO | 02/076117 A2 | 9/2002 |
| WO | WO 02/104062 | 12/2002 |
| WO | WO 02/104062 A1 | 12/2002 |
| WO | WO 03/067917 | 8/2003 |
| WO | WO 03/067917 A1 | 8/2003 |
| WO | 2004/040931 A2 | 5/2004 |

* cited by examiner

METHOD AND SYSTEM FOR SUPPORTING NETWORK 3G DATA CAPABILITY INFORMATION IN A CDMA NETWORK

FIELD OF THE INVENTION

The present invention relates to CDMA2000 mobile networks, and more particularly to the interaction between always-on mobile data devices and third generation CDMA2000 networks.

BACKGROUND

In CDMA2000 networks it is important for a wireless data device to acquire and stay in a network that provides third generation (3G) data services such as email, browser and short message service (SMS) text messaging to the device. An always-on device should always try to keep a valid point-to-point protocol (PPP) session in order to send or receive data packets in a timely manner. When a mobile data device loses its PPP session or the device moves to a new network where, for example, the SID/NID/packet zone ID (system identification/network identification/packet zone identification) changes, the device should try to negotiate for a new PPP session with the network.

The problem with this, however, is that in current CDMA2000 networks there is no information broadcast to a mobile device on whether the network supports data services. The mobile device is merely notified that is has acquired a second generation (2G) or a 3G system.

Third generation systems do not always support data services. In some cases such a network only supports 3G voice services. In other situations such 3G networks might not have a data roaming agreement with the mobile device's home network, and therefore not allow the mobile device to access data services.

A mobile data device moving into a system that does not support 3G data currently wastes battery power by trying to establish a data connection with the network. Further, such attempts to establish a data connection waste network resources.

SUMMARY OF THE INVENTION

The present invention seeks to overcome the above deficiencies by providing a mobile data device with information about the capabilities of networks the device can connect to. Each mobile device includes a preferred roaming list (PRL) built into it, which assists the device to perform system selection and acquisition. This PRL includes the SID/NID pair Preference and Roaming Indication to aid the device in deciding whether the system is a preferred system that the device should connect to. In the present invention, information about whether the network supports 3G data capability is added to the PRL to assist a device in deciding whether it should connect to the network.

Other information that can be added to the PRL in the present invention includes whether the network supports data roaming for the device's home network. This allows the mobile data device to know whether the network can be connected to for data roaming services.

Also, with the advent of Mobile IP (Internet Protocol), a device prefers to connect to a network that supports Mobile IP rather than simple IP. This allows the device to move between networks with less time and effort spent establishing an IP connection. Information about whether the network supports Mobile IP can also be added to the PRL.

Further, with CDMA2000 networks, a device will prefer a packet data serving node that supports the always-on feature. Information about whether the network supports this feature can also be added to the PRL.

The new information provided to an always-on data device allows the device to create its own system preferences based on the 3G data capability of the network. If the network does not provide data capability, the device should search for a different network and not try to establish a PPP session, thereby saving batteries and network resources. Further, an attempt to connect to preferred networks, such as those that support Mobile IP data services and data roaming, should be made before attempting to connect to networks that do not support these services. The mobile data device should also try to stay in these networks whenever possible.

In present wireless devices, the device does not know what data service capabilities it has. The network stores this information, and resources may be wasted in attempting to utilize services the device does not support. A further possibility is therefore to include a field in the PRL to indicate what services the device supports. This will save battery life and network capacity by preventing the device from attempting to utilize a service it does not support.

The present invention therefore includes a method of providing a mobile data device in a wireless system with information about preferred networks to connect to, said mobile data device having a preferred roaming list with a list of networks, said method comprising the steps of: adding information to the preferred roaming list about data capabilities of each network; and determining preferred networks based on information within said preferred roaming list including a geographic area and the data capabilities of said network.

The present invention further includes a method of providing a mobile data device in a wireless system with information about preferred networks to connect to, said mobile data device having a preferred roaming list with a list of networks, said method comprising the steps of: adding information to the preferred roaming list about whether each said network in said list of networks supports third generation data capabilities; and determining preferred networks based on information within said preferred roaming list including a geographic area and whether said network supports third generation data capabilities whereby, within said geographic area, said mobile data device prefers those of said networks which support third generation data capabilities over said networks which do not support third generation data capabilities.

The present invention still further includes a method of providing a mobile data device in a wireless system with information about preferred networks to connect to, said mobile data device having a preferred roaming list with a list of networks, said method comprising the steps of: adding to the preferred roaming list information about whether each said network in said list of networks supports third generation data capabilities; adding to the preferred roaming list information about whether each said network in said list of networks supports data roaming; adding to the preferred roaming list information about whether each said network in said list of networks supports Mobile IP service; adding to the preferred roaming list information about whether each said network in said list of networks supports an always-on feature; and determining preferred networks based on information within said preferred roaming list including a geographic area and whether said network supports third generation data capabilities, data roaming, Mobile IP service and always-on feature; whereby, within said geographic area, said mobile data device firstly prefers those of said networks which support said third generation data capabilities over networks which do not support said third generation data capabilities, secondly prefers those of said networks which support said data roaming over networks which do not support said data roaming, thirdly prefers those of said networks which support said Mobile IP service over networks which do not support said Mobile IP service, and fourthly prefers those of said networks which support said always-on feature over networks which do not support said always-on feature.

The present invention still further includes A system for providing a mobile data device in a wireless system with information about preferred networks to connect to from a list of networks, said system comprising: the mobile data device, said mobile data device being capable of connecting to some or all networks within said list of networks; and a preferred roaming list within said mobile data device, said preferred roaming list including: identification information for each network within said list of networks; geographic information for each network within said list of networks; and information about each network within said list of networks indicating whether each network supports data capability; whereby said mobile data device chooses a preferred network based on said geographic information and those of said networks within said list of networks that supports said data capability.

BRIEF DESCRIPTION OF THE DRAWINGS

The present invention will be better understood with reference to the drawings, in which.

DETAILED DESCRIPTION

Figure 1:
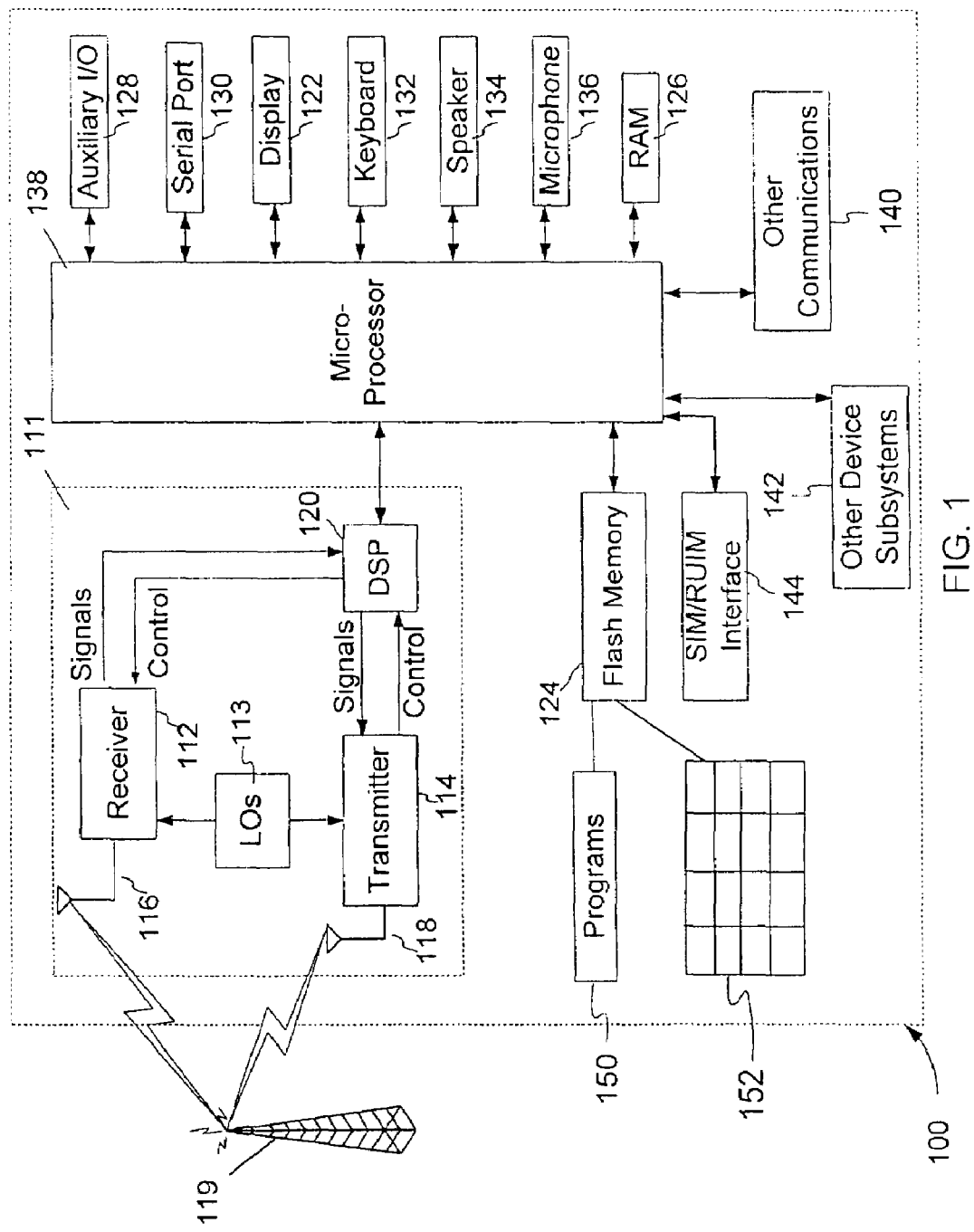
FIG. 1 is a schematic diagram of a wireless device of the present invention.

Referring to the drawings, mobile data device 100 is preferably a two-way wireless communication device. Where mobile data device 100 is enabled for two-way communication, it will incorporate a communication subsystem 111, including both a receiver 112 and a transmitter 114, as well as associated components such as one or more, preferably embedded or internal, antenna elements 118, local oscillators (LOs) 113, and a processing module such as a digital signal processor (DSP) 120. As will be apparent to those skilled in the field of communications, the particular design of the communication subsystem 111 will be dependent upon the communication network in which the device is intended to operate.

When required network registration or activation procedures have been completed, mobile data device 100 may send and receive communication signals over the network 119. Signals received by antenna 116 through communication network 119 are input to receiver 112, which may perform such common receiver functions as signal amplification, frequency down conversion, filtering, channel selection and the like, and analog to digital (A/D) conversion.

Mobile data device 100 preferably includes a microprocessor 138, which controls the overall operation of the device. Communication functions are performed through communication subsystem 111. Microprocessor 138 also interacts with further device subsystems such as the display 122, flash memory 124, random access memory (RAM) 126, auxiliary input/output (I/O) subsystems 128, serial port 130, keyboard 132, speaker 134, microphone 136, a short-range communications subsystem 140 and any other device subsystems generally designated as 142.

Preferred roaming lists used by the microprocessor 138 during network registration are preferably stored in a persistent store such as flash memory 124, which may instead be a read-only memory (ROM) or similar storage element (not shown).

As shown, flash memory 124 can be segregated into different areas for both programs storage 150 and preferred roaming list 152.

Mobile devices 100 use preferred roaming lists to determine with whom contact should attempt to be established. This is useful when the mobile device loses the signal from the base station and a new signal needs to be acquired.

Table 1 shows an example of a PRL table as currently used by wireless devices 100. One skilled in the art will realize that the information may be arranged differently depending on the mobile device, and that Table 1 is merely an example of a PRL table.

TABLE 1

| INDEX | SID  | NID   | N/PREF | GEO  | PRI  | ACQ | ROAM |
|-------|------|-------|--------|------|------|-----|------|
| 0     | 253  | 65535 | Pref   | NEW  | SAME | 21  | 0    |
| 1     | 3682 | 65535 | Pref   | SAME | MORE | 2   | 0    |
| 2     | 2157 | 65535 | Pref   | SAME | SAME | 14  | 1    |
| 3     | 46   | 65535 | Pref   | NEW  | SAME | 6   | 0    |
| 4     | 257  | 65535 | Pref   | SAME | SAME | 7   | 1    |

If a mobile device 100 loses its signal, the device will attempt to reestablish contact. This will be done based on the information in the PRL. This information includes whether the SID/NID pair is negative or banned, or preferred and desired, as indicated in the column labeled N/PREF.

The PRL further includes information about whether the SID/NID pair is in the same or different geographical area. In Table 1, most of the entries are marked SAME under the GEO column. This means that they are in the same geographical area as the previous index SID. When the column indicates NEW, this SID is in a different geographical area than the previous index SID. The mobile device will first attempt to establish contact with a system in the same geographical area as the signal it just lost.

The then current PRL list of preferred networks is considered together with the then available networks to derive a ranked list of available networks. The PRL then ranks the priority of each system. This is seen in the column labeled PRI in Table 1, SAME indicates that the SID has the same priority as the next indexed SID. MORE indicates that the SID has more priority than the next indexed SID.

In Table 1, if a mobile device loses the signal for SID 2157, it first looks for a new network in the same geographical area, or within SIDS 253, 3682 and 2157. Within these areas the mobile device then looks for the highest priority networks, which in the example are SIDs 253 and 3682. If these cannot be connected to, the mobile device moves to the next highest priority network, which in the example is SID 2157.

ACQ is the acquisition index, which tells the mobile device which channels to look for signals on. Roam tells the mobile device what to do with the roam indicator.

As indicated above, the problem with current PRL system tables is that they do not tell the mobile device whether the SID/NID pair support third generation data capabilities. This could lead to a mobile data device attempting to make contact with a SID/NID pair that does not support data capability, thus wasting both battery power on the mobile device and network resources due to the attempt to establish contact.

Table 2 shows an example PRL system table using the method and system of the present invention. Table 2 includes a column that indicates whether the SID/NID pair supports third generation data communications. One skilled in the art will realize that there are other ways to amend a PRL table to indicate that the SID/NID pair supports data capability, and the table below is merely meant to be illustrative of one way to implement this.

TABLE 2

| INDEX | SID | NID | N/PREF | GEO | PRI | ACQ | ROAM | 3G Data |
|---|---|---|---|---|---|---|---|---|
| 0 | 253 | 65535 | Pref | NEW | SAME | 21 | 0 | 0 |
| 1 | 3682 | 65535 | Pref | SAME | MORE | 2 | 0 | 1 |
| 2 | 2157 | 65535 | Pref | SAME | SAME | 14 | 1 | 1 |
| 3 | 46 | 65535 | Pref | NEW | SAME | 6 | 0 | 0 |
| 4 | 257 | 65535 | Pref | SAME | SAME | 7 | 1 | 1 |

Using the PRL system table of Table 2, a mobile device can determine whether to attempt to establish communications with an SID/NID pair. Using the above example, if the mobile device 100 loses contact with SID 2157, it will attempt to establish contact based on the PRL table in Table 2. This is done by geography first in this case, but now also by 3G data capability. In the prior art model, the mobile device would have first attempted to establish contact with SID 253. However, using the method of the present invention the mobile data device does not attempt to contact SID 253 since it does not support 3G data capability. This saves both battery power and system resources. The device instead attempts to communicate with SID 3682 first.

One skilled in the art will appreciate that the PRL table of Table 2 can also save resources by identifying to the mobile device that no SID/NID pair in the area supports data capability, and thus the system should not attempt to establish contact at all.

Table 2 overcomes many of the deficiencies of the prior art. However, an alternate preferred PRL table may also include information about whether the SID/NID pair allows data roaming. This is used, for example, if the mobile device is outside of its home system. Table 3 shows an example of a PRL that includes information about whether the SID/NID will allow data roaming.

Table 3 includes the additional column for data roaming, indicating whether the network will accept data roaming. If it does not, the mobile data device that is not within that system as its home system will not attempt to establish communications with this SID.

Continuing with the above example, if the mobile device 100 is not within its home system for SID 3682, it will know that 3682 does not allow roaming, and thus not attempt to establish contact with this system. The device will instead move to SID 2157, which allows 3G data services and also allows roaming.

One skilled in the art will realize that 3G data and roaming may be combined or may be represented differently from the PRL system table of Table 3.

A further benefit would be to know whether the SID supports Mobile IP. Mobile IP allows a mobile device to move between SID/NID pairs without having to establish a simple IP. This presents significant benefits for roaming with mobile data devices.

A further preference criterion for a PRL can thus be whether the system supports Mobile IP. An example is illustrated in Table 4 below.

TABLE 3

| INDEX | SID | NID | N/PREF | GEO | PRI | ACQ | ROAM | 3G Data | Data Roam |
|---|---|---|---|---|---|---|---|---|---|
| 0 | 253 | 65535 | Pref | NEW | SAME | 21 | 0 | 0 | 0 |
| 1 | 3682 | 65535 | Pref | SAME | MORE | 2 | 0 | 1 | 0 |
| 2 | 2157 | 65535 | Pref | SAME | SAME | 14 | 1 | 1 | 1 |
| 3 | 46 | 65535 | Pref | NEW | SAME | 6 | 0 | 0 | 0 |
| 4 | 257 | 65535 | Pref | SAME | SAME | 7 | 1 | 1 | 1 |

TABLE 4

| INDEX | SID | NID | N/PREF | GEO | PRI | ACQ | ROAM | 3G Data | Data Roam | Mobile IP |
|---|---|---|---|---|---|---|---|---|---|---|
| 0 | 253 | 65535 | Pref | NEW | SAME | 21 | 0 | 0 | 0 | 1 |
| 1 | 3682 | 65535 | Pref | SAME | MORE | 2 | 0 | 1 | 0 | 1 |
| 2 | 2157 | 65535 | Pref | SAME | SAME | 14 | 1 | 1 | 1 | 0 |
| 3 | 46 | 65535 | Pref | NEW | SAME | 6 | 0 | 0 | 0 | 1 |
| 4 | 257 | 65535 | Pref | SAME | SAME | 7 | 2 | 1 | 1 | 1 |

In Table 4, the preference is first given by geography, then by 3G data capability, then by roaming, and finally by whether the network supports Mobile IP services.

A further benefit would be to know whether the packet data serving node (PDSN) supports an always-on feature. If the device is an always-on device and the PDSN supports an always-on feature, the PDSN is informed that the device is an always-on device and the device is informed about the maximum PPP inactivity time. Based on this, an always-on device would prefer to select a network that supports the always-on feature.

A further preference criterion for a PRL can thus be whether the system supports the always-on feature. An example is illustrated in Table 5 below.

the service configuration file at the network. The device is aware of the service that the network supports only after it sends a service request that is granted or rejected by the network.

In operation, if the device wants to send an SMS message in a non-provisioned network, the device first sends an SMS origination request to set up a dedicated traffic channel. The device next sends an SMS message on the dedicated traffic channel. Finally the network checks whether the devices is entitled to the SMS service. If not, the network sends an SMS error code to the device.

By adding device service information to the PRL, the device has the ability to know its service capability at the time

TABLE 5

| INDEX | SID | NID | N/PREF | GEO | PRI | ACQ | ROAM | 3G Data | Data Roam | Mobile IP | Always-On |
|---|---|---|---|---|---|---|---|---|---|---|---|
| 0 | 253 | 65535 | Pref | NEW | SAME | 21 | 0 | 0 | 0 | 1 | 0 |
| 1 | 3682 | 65535 | Pref | SAME | MORE | 2 | 0 | 1 | 0 | 1 | 1 |
| 2 | 2157 | 65535 | Pref | SAME | SAME | 14 | 1 | 1 | 1 | 0 | 1 |
| 3 | 46 | 65535 | Pref | NEW | SAME | 6 | 0 | 0 | 0 | 1 | 0 |
| 4 | 257 | 65535 | Pref | SAME | SAME | 7 | 1 | 1 | 1 | 1 | 0 |

In Table 5, the preference is first given by geography, then by 3G data capability, then by roaming, then by whether network supports Mobile IP services, and finally by whether the network support an always-on feature. One skilled in the art will realize that preference can be given to networks using a different ordering of the PRL table data, and that in some cases various columns in the PRL table may be omitted altogether.

The implementation of the table can further be a single data capability field, in which, for example, an eight bit field could use various bits to signify whether the network supported always-on, mobile IP, 3G data and data roaming, or other data capability features. For example, the first bit in the field could signify that the network supported an always-on feature with a "1", or that the network did not support the always-on feature with a "0". The remaining bits could similarly be used for other data capability information.

In a wireless system where the mobile data device can connect to a plurality of networks, the above is implemented by amending the PRL table and the logic for establishing priority within the mobile device. The PRL table can be modified and loaded onto the mobile device through known methods within the art. Further, the mobile device can be programmed to select preferred networks based on the modified PRL table.

A further benefit would be to know whether the data device is able to support various services, such as voice, data, or SMS. The device is configured by the carrier for specific services based upon the service plan that the user selects. In the current CDMA2000 standard, the device is not aware of the network is acquired and without any service request being sent out. This saves battery life and system capacity by ensuring the device does not attempt to establish a service it does not have the capability for.

A further preference criterion for a PRL can thus be the device service capability. An example is illustrated in Table 6 below.

TABLE 6

| INDEX | SID | NID | N/PREF | GEO | PRI | ACQ | Data Capability | Device Service Capability |
|---|---|---|---|---|---|---|---|---|
| 0 | 253 | 65535 | Pref | NEW | SAME | 21 | 01100000 | 1010 |
| 1 | 3682 | 65535 | Pref | SAME | MORE | 2 | 00110000 | 1010 |
| 2 | 2157 | 65535 | Pref | SAME | SAME | 14 | 11010000 | 1010 |
| 3 | 46 | 65535 | Pref | NEW | SAME | 6 | 00010000 | 1010 |
| 4 | 257 | 65535 | Pref | SAME | SAME | 7 | 11110000 | 1010 |

In Table 6, the preference to the choice of network is made as above, with the data capability field using the first four bits to indicate 3G data, Mobile IP, Always-On PDSN and data roaming. The device further has information about what services it supports. In Table 6, the four bits can, for example, indicate whether the device supports data service (first bit), voice service (second bit), SMS (third bit) and browser (fourth bit). The device will thus know what types of service it can request.

In a preferred embodiment, the carrier could update the device by downloading a new PRL when the user changes their service plan. The device could further display the services it supports using an icon to indicate its service capability.

Figure 2:
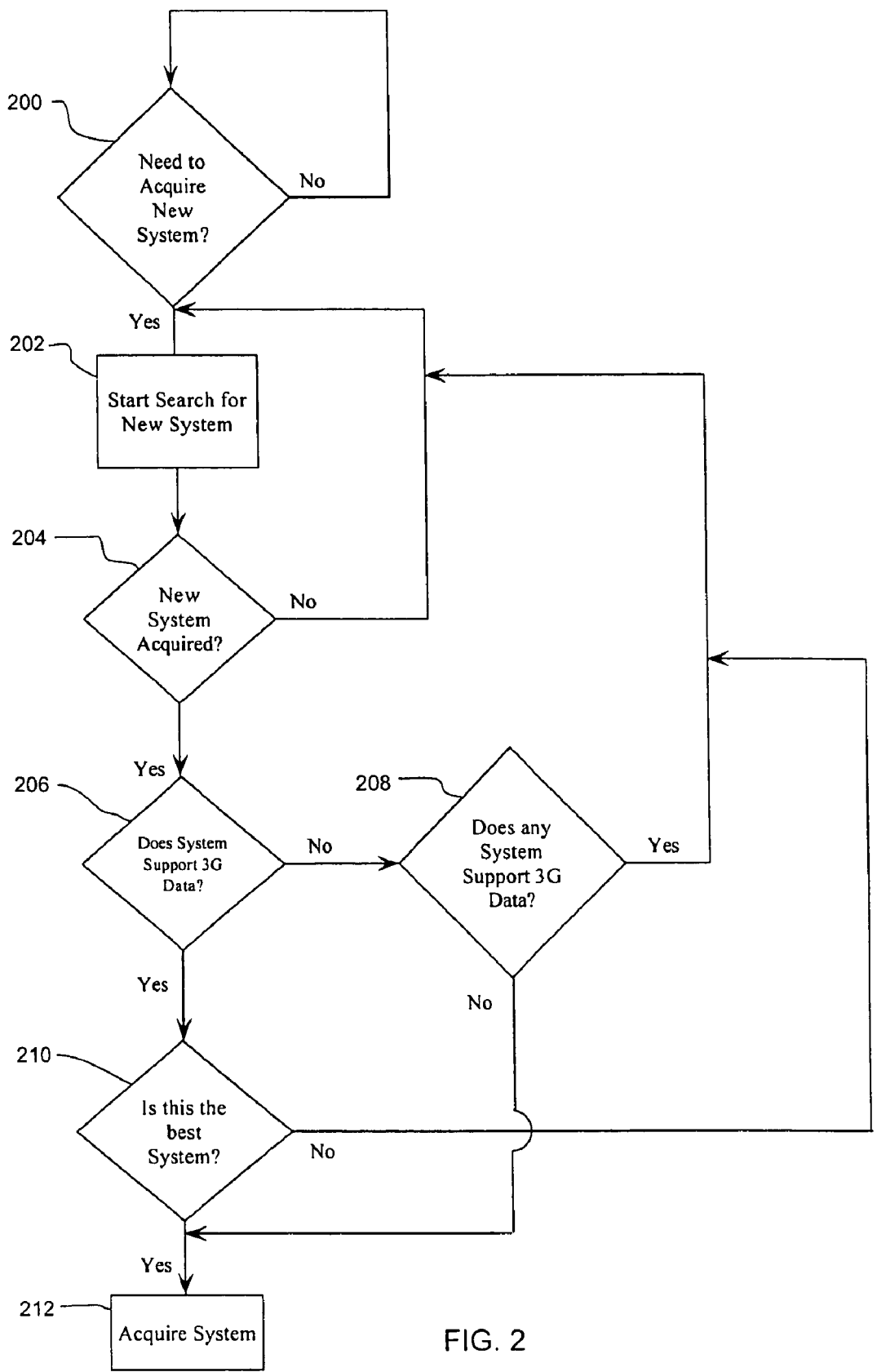
FIG. 2 is a flow diagram of a method of acquiring a system according to the method of the present invention.

The above will be better understood with reference to FIG. 2. In FIG. 2, a mobile device 100 stays in step 200 until the device realizes that it needs to acquire a new system. If the device 100 does not need to acquire a new system, the device stays in step 200.

Once mobile device 100 realizes it needs to acquire a new system, mobile data device 100 moves to step 202 in which it stats a search for a new system. In step 204 mobile device 100 determines whether it has acquired a new system.

In step 204, if the device finds that it has not acquired a new system, the device moves back to step 202 in which a search for a new system is again started.

Conversely, if the device finds that a new system has been acquired, the device next moves to step 206. In step 206 the device asks the PRL table whether the potential system supports third generation (3G) data capabilities. As indicated above, for a data device this is a key feature.

In step 206 if the device finds that the potential network does not support third generation data, the system next moves to step 208. In step 208 the device asks whether any network that the device can access supports third generation data capability. If step 208 finds networks that support 3G data capability, the device will prefer to connect to those networks, and will thus move back to step 202 and start a search for a new system.

Conversely, if the network does not support third generation data capability, the device can either decide not to connect to a system (not shown) or can connect to the potential system acquired in step 204.

If in step 206 the system that is found supports 3G data, the system next moves to step 210. In step 210 the device asks whether this is the best system to connect to. The decision in step 210 is based on the PRL table and the information contained therein. Specifically, depending on the device, it may prefer systems that support mobile IP, data roaming or always-on capabilities. Based on the device and the PRL table, a decision is made in step 210 whether the potential system is the best system to acquire.

If step 210 finds that the best system is being acquired, the system next moves to step 212 and acquires the system. Conversely, if step 210 finds that a better system exists, the device moves back to step 202 and start a search for the new system.

The above-described embodiments of the present invention are meant to be illustrative of preferred embodiments and are not intended to limit the scope of the present invention. Also, various modifications, which would be readily apparent to one skilled in the art, are intended to be within the scope of the present invention. The only limitations to the scope of the present invention are set forth in the following claims appended hereto.

We claim:

1. A method for a mobile data device to determine a new network to acquire out of a plurality of networks, the method comprising the steps of:
   providing information about the plurality of networks in a preferred roaming list, the preferred roaming list comprising
      a plurality of preference criteria associated with each of the plurality of networks; and
      a list of service features supported by the mobile data device;
   waiting until the new network needs to be acquired;
   identifying which of the plurality of networks support a first one of the plurality of preference criteria by inspecting the first one of the plurality of preference criteria of each of the plurality of networks in the preferred roaming list; and
   selecting the new network from the identified networks;
   starting a search for the selected new network.

2. The method of claim 1, wherein said plurality of preference criteria includes at least geographic information and data capability information.

3. The method of claim 2, wherein the plurality of preference criteria further includes information about whether each of the available networks support data roaming for the mobile data device.

4. The method of claim 2, wherein the plurality of preference criteria further includes whether each of the available networks supports mobile IP.

5. The method of claim 4, wherein the plurality of preference criteria further includes whether each of the available networks supports an always-on device.

6. The method of claim 2, wherein said plurality of preference criteria further includes a list of services the network supports.

7. The method of claim 1, wherein said choosing step can find no networks are available.

* * * * *

UNITED STATES PATENT AND TRADEMARK OFFICE
CERTIFICATE OF CORRECTION

PATENT NO.        : 7,509,122 B2                                     Page 1 of 1
APPLICATION NO. : 10/755812
DATED             : March 24, 2009
INVENTOR(S)       : Hao Xue et al.

It is certified that error appears in the above-identified patent and that said Letters Patent is hereby corrected as shown below:

Front page, second column, delete duplicate "EP   0 781 064 A2   6/1997" should read EP 0781064 6/1997--.
    Page 2, second column, Foreign Patent Document "WO   WO02/104062   12/2003" is printed twice. Remove duplicate.
    Page 2, second column, Foreign Patent Document "WO   WO/03/067197   08/2003" is printed twice. Remove duplicate.
    Column 1, line 27, "that is has" should read --that it has--.
    Column 3, line 4, "includes A system" should read --includes a system--.
    Column 7, line 29, "network support an" should read --network supports an--.
    Column 8, line 9, "the devices is" should read --the device is--.
    Column 9, line 1, "stats" should read --starts--.
    Column 9, line 35, "start" should read --starts--.

Signed and Sealed this

Sixth Day of July, 2010

David J. Kappos
*Director of the United States Patent and Trademark Office*